United States Patent [19]
Sutu et al.

[11] Patent Number: 5,619,672
[45] Date of Patent: Apr. 8, 1997

[54] PRECISE TRANSLATION LOOKASIDE BUFFER ERROR DETECTION AND SHUTDOWN CIRCUIT

[75] Inventors: Yue-Hong Sutu, Pleasanton; Paul K. French, Cupertino, both of Calif.

[73] Assignee: Silicon Graphics, Inc., Mountain View, Calif.

[21] Appl. No.: 245,983

[22] Filed: May 17, 1994

[51] Int. Cl.$^6$ .................................................. G06F 12/10
[52] U.S. Cl. ............................................. 395/417; 365/49
[58] Field of Search ................................ 365/49; 395/417

[56] References Cited

U.S. PATENT DOCUMENTS

| | | | |
|---|---|---|---|
| 5,220,526 | 6/1993 | Giles et al. | 365/49 |
| 5,325,507 | 6/1994 | Freitas et al. | 365/49 |

*Primary Examiner*—David L. Robertson

[57] ABSTRACT

A precise TLB error detection and shutdown circuit that detects for two or more matching tag entries in a TLB by providing an array of n units of error detection circuit unit $<i>$, wherein each error detection unit $<i>$ comprises a first input $B<i>$ coupled to an associated bit $<i>$ of an input n-bit tag compare indicator. A second input $A<i>$ is coupled to an output bit of an immediately preceding error detection unit $<i-1>$. A third input $C<i>$ is coupled to a output bit of a immediately preceding error detection unit $<i-1>$. Each error detection unit $<i>$ generates a first output bit $X<i>$, the output indicator $X<i>$ indicating a result of detecting two or more matching tag entries, and a second output indicator $Y<i>$, the output indicator $Y<i>$ indicating a result of detecting one or more matching tag entries. The TLB shutdown circuit generates an active TLB shutdown indicator in response to detecting an active state in the address translation cycle indicator and an active state in a terminal output indicator $X<n-1>$ from the array error detection units.

13 Claims, 6 Drawing Sheets

5,619,672

PRECISE TRANSLATION LOOKASIDE BUFFER ERROR DETECTION AND SHUTDOWN CIRCUIT

FIELD OF THE INVENTION

The present invention relates generally to translation lookaside buffers (TLBs) for a computer system, and more specifically to an error detection and damage prevention circuit for translation lookaside buffers.

BACKGROUND

Implementations of translation lookaside buffers (TLBs) are well known in the art of computer designs and FIG. 1 illustrates a typical block diagram of a TLB configuration within a computer. As shown in FIG. 1, during an execution cycle of a computer, a virtual address is typically supplied via virtual address bus 73 from an execution unit (not shown) of the computer to TLB 70. One or more tag entries from a tag RAM array 71 (also referred to as a tag vector array) selected by the received virtual address is provided to an array of virtual address comparators 72. Each address comparator in comparator array 72 generates an output tag compare bit indicating whether a tag entry match is detected for an associated tag entry in tag RAM array 71. Typically, the output compare bit of the comparator corresponds to a logical "1" whenever a tag entry match is detected between the tag entry and the virtual address. Comparator array 72 thus generates a n-bit tag compare signal 74 indicating a collective result of comparing the one or more selected tag entries of tag vector array 71 to the virtual address.

N-bit tag compare signal 74 is coupled to a physical address RAM array 82 (also referred to as PA vector array) to select a corresponding physical address 78 to be supplied as an output of PA array 82. Thus, when an active address translation cycle signal 86 from a TLB control unit (not shown) is provided to PA array 82, additional control logic in that array enables selected physical address 78 to be available at the output of PA array 82 so to be placed onto a physical address bus 84, thereby providing that address to other devices of the computer, such as a main memory device.

A direct mapped TLB, a set associative TLB, and a fully associative TLB are examples of common types of TLB implementations. In both the set associative TLB and the fully associative TLB, the virtual address is typically supplied to multiple entries of the tag vector array rather than a single tag entry as is in a direct mapped TLB. A problem that occurs with set associative and fully associative TLB implementations is that, occasionally, a matching virtual address is detected in more than one tag entry of the TLB. The detection of more than one matching tag entry results in multiple selected TLB physical address vectors contending for access to the physical address bus to the main memory. This contention for the same bus could result not only in placing a corrupted address onto the bus, but also causing some of the selected PA vectors to be overwritten by other simultaneously selected PA vectors.

U.S. Pat. No. 5,237,671 ("the '671 Patent") describes a TLB shutdown circuit that uses an analog comparator to determine when a multiple tag entry match occurs by detecting the voltage variation in a pull-up line that is coupled to every output in an array of virtual address comparators. However, because the voltage difference between a one tag entry match and a two tag entry match is difficult to detect, the TLB shutdown circuit of the '671 Patent is designed to detect a voltage difference between when a one tag entry match occurs and when greater than five tag entry matches occur. A single tag entry match indicates normal TLB operation, while greater than five tag entry matches signifies an addressing error and triggers the generation of a TLB shutdown signal. But since data corruption and error can result when even two matching tag entries occur, there is therefore a need to provide means for detecting whenever two or more matching TLB tag entries occur, and to indicate a TLB address translation error on such occasions.

SUMMARY OF THE INVENTION

A precise TLB error detection and shutdown circuit is provided to detect the occurrence of when two or more TLB tag entries match a virtual address. The error detection and shutdown circuit comprises an array of n units $<i>$ of error detection circuits and a shutdown circuit coupled to that array. The array of error detection circuits receives as input a n-bit tag compare indicator supplied from an array of tag comparators of the TLB. Each error detection unit $<i>$ in the array of error detection circuits has a first input $B<i>$, which is coupled to an associated bit $<i>$ of the n-bit tag compare indicator. A second input $A<i>$ is coupled to receive an output comparison result indicator $Y<i-1>$ from the immediately preceding error detection unit $<i-1>$ in the array of error detection circuits. Output $Y<i-1>$ indicates a result of detecting one or more logical "1's" in a set of tag compare bits $B[(i-1) \ldots 0]$, wherein the detection of one or more logical "1's" in this set of bits indicates an occurrence of one or more matching tag entries. A third input $C<i>$ is coupled to receive an output indicator $X<i-1>$ from the immediately preceding error detection unit $<i-1>$. Output $X<i-1>$ indicates a result of detecting two or more logical "1's" in a set of tag compare bits $B[(i-1) \ldots 0]$, wherein the detection of two or more logical "1's" in this set of bits indicates an occurrence of two or more matching tag entries.

Each error detection unit $<i>$ generates a first output error indicator, $X<i>$, for indicating two or more matching tag entries (e.g., indicating two or more logical "1's" in a set of tag compare bits $B[i \ldots 0]$), and a second output indicator, $Y<i>$, for indicating one or more matching tag entries (e.g., indicating one or more logical "1's" in a set of tag compare bits $B[i \ldots 0]$). Each output $X<i>$ and each output $Y<i>$ corresponds to a logical result of a Boolean function, wherein:

$$X<i>=(A<i>B<i>)+C<i>$$

and $$Y<i>=A<i>+B<i>.$$

The TLB shutdown logic circuit is coupled to the array of error detection units so as to receive a terminal $X<i>$ output indicator, $X<n-1>$, provided from a terminal detection circuit unit $<n-1>$. The TLB shutdown circuit also receives an address translation cycle indicator supplied from a TLB control circuit, which causes the shutdown circuit to generate an active TLB shutdown indicator upon detecting an active state in the address translation cycle indicator and an active state in the terminal output indicator, $X<n-1>$.

3

Figure 1:
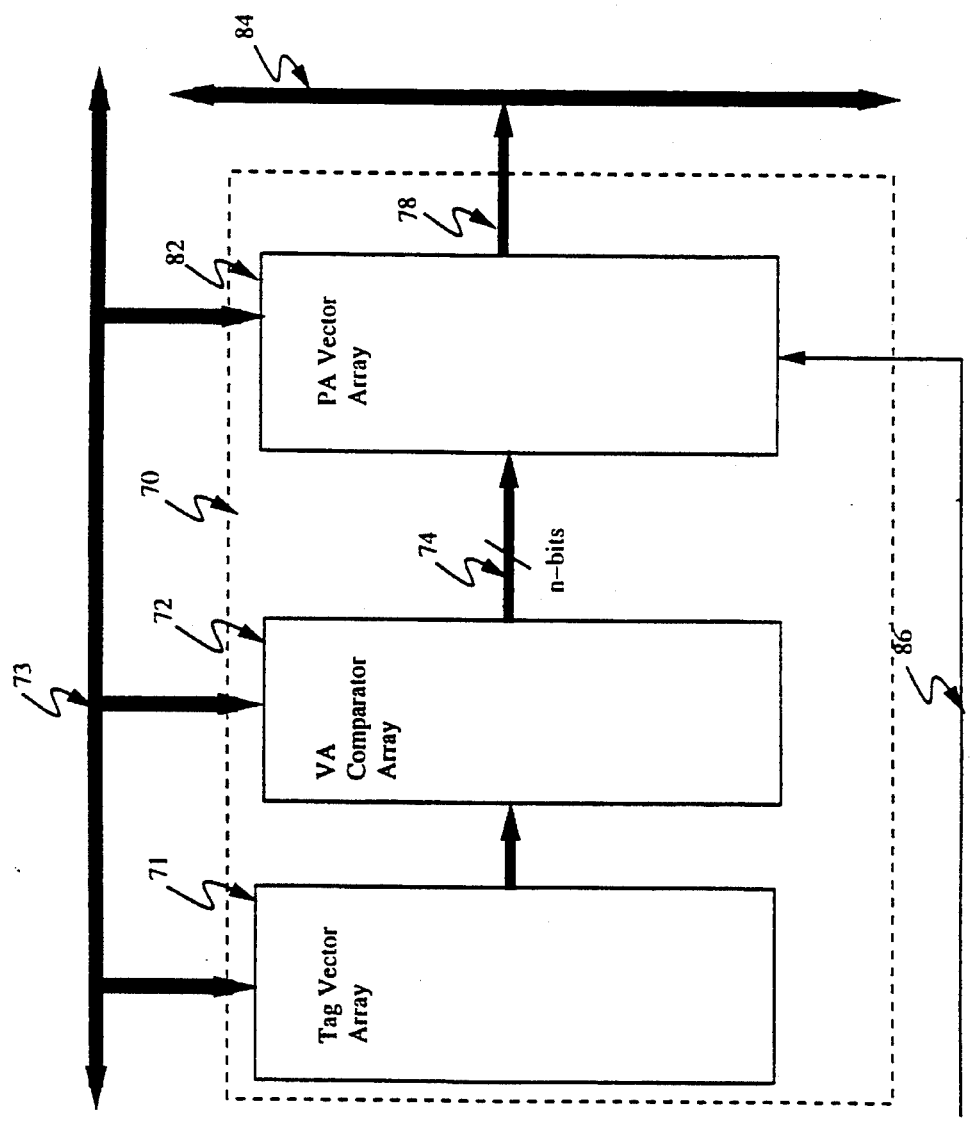
FIG. 1 illustrates a block diagram of a typical prior art TLB.
Figure 2:
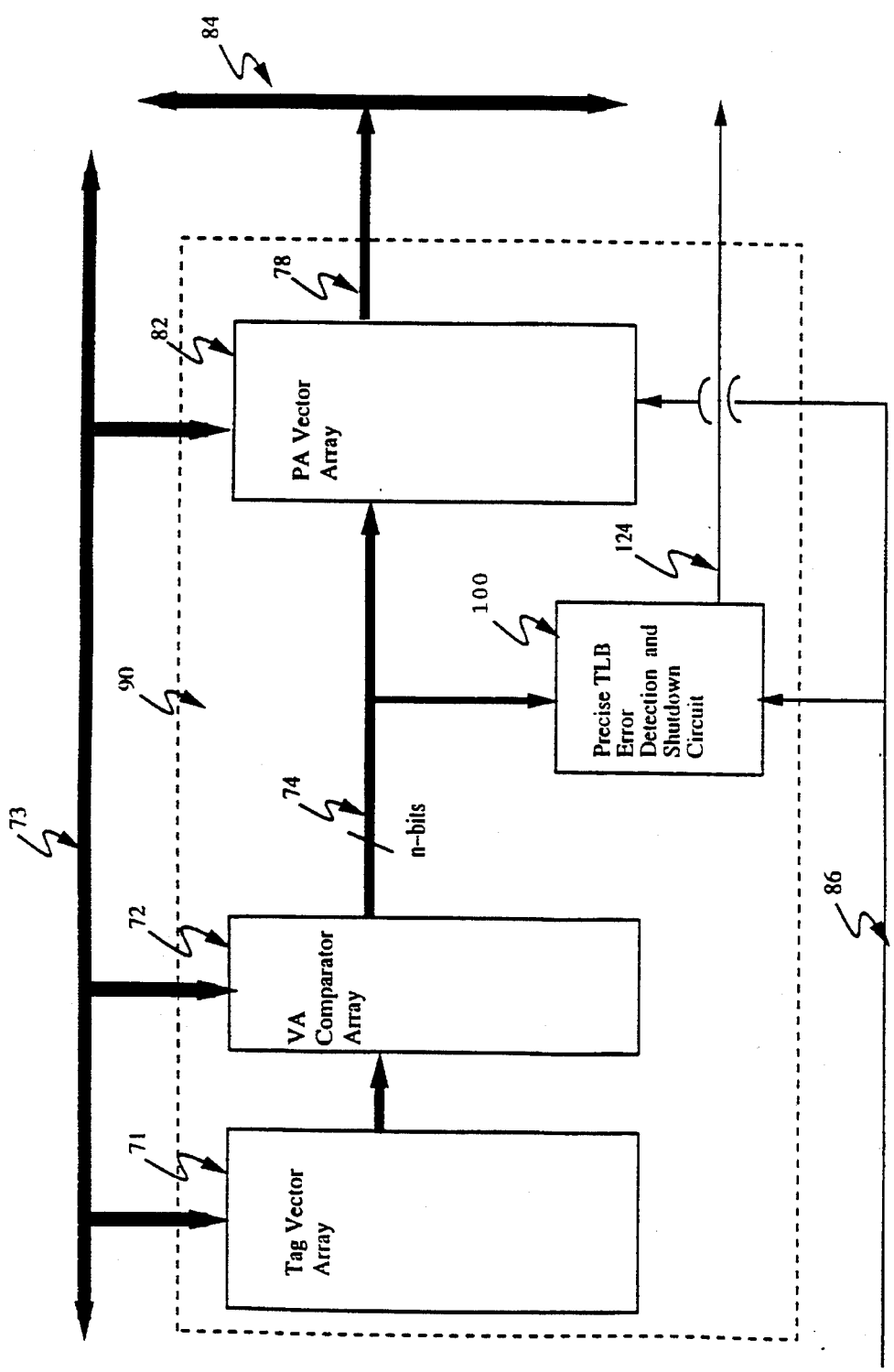
Figure 3:
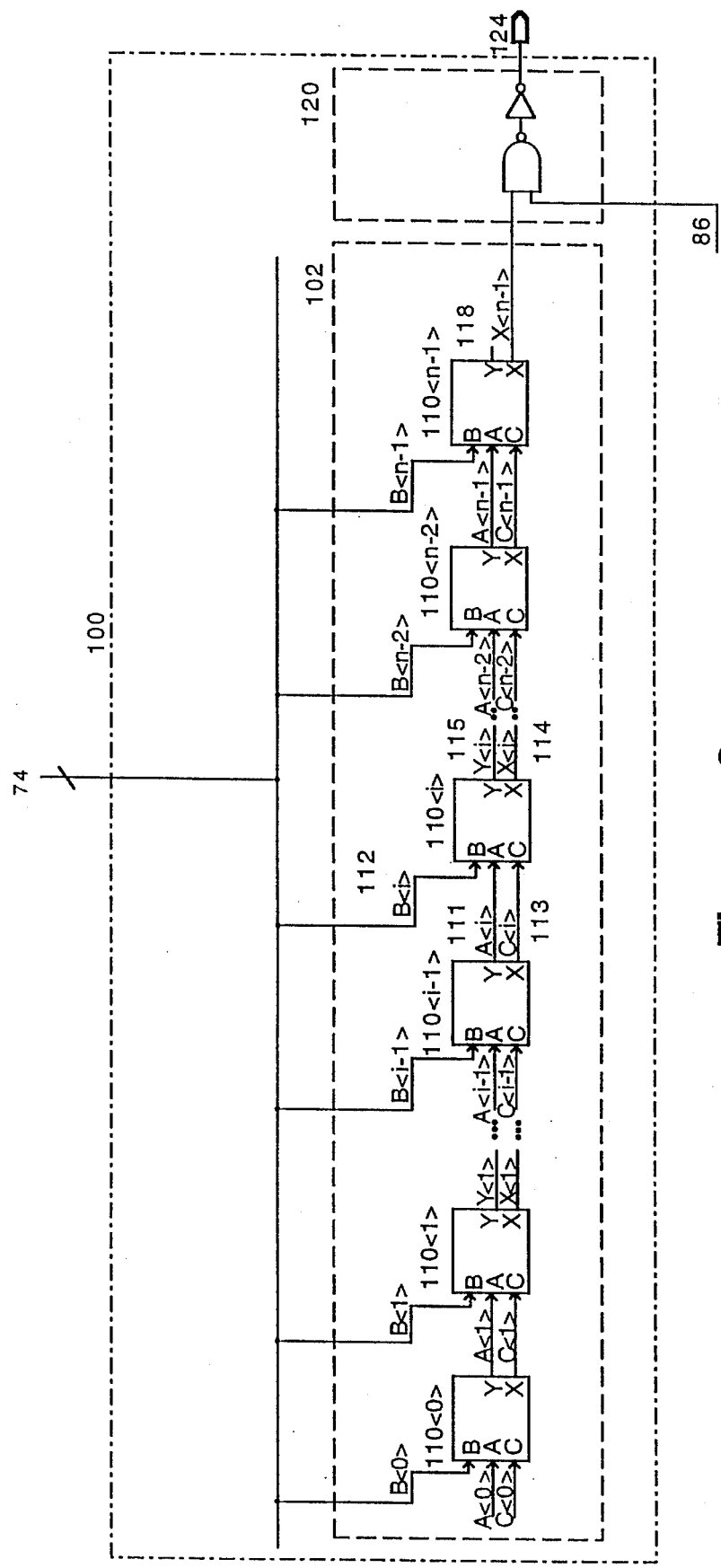
Figure 4A:
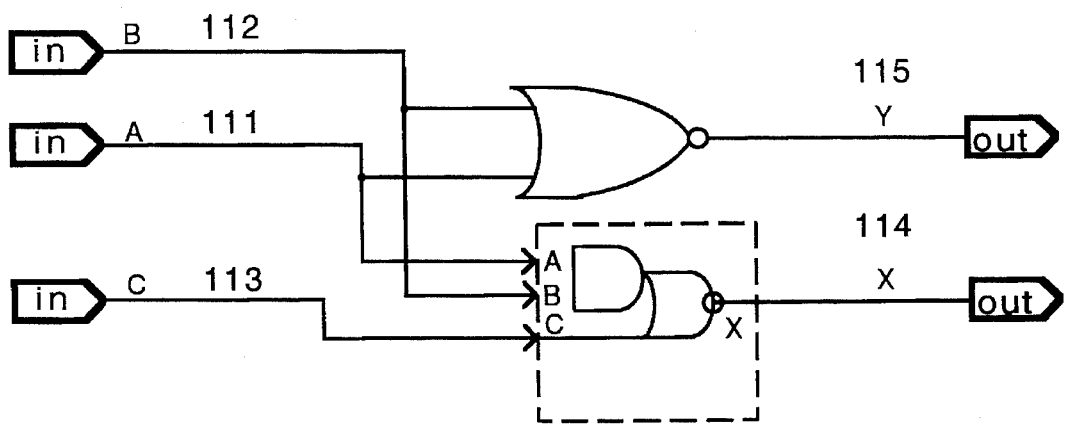
Figure 4B:
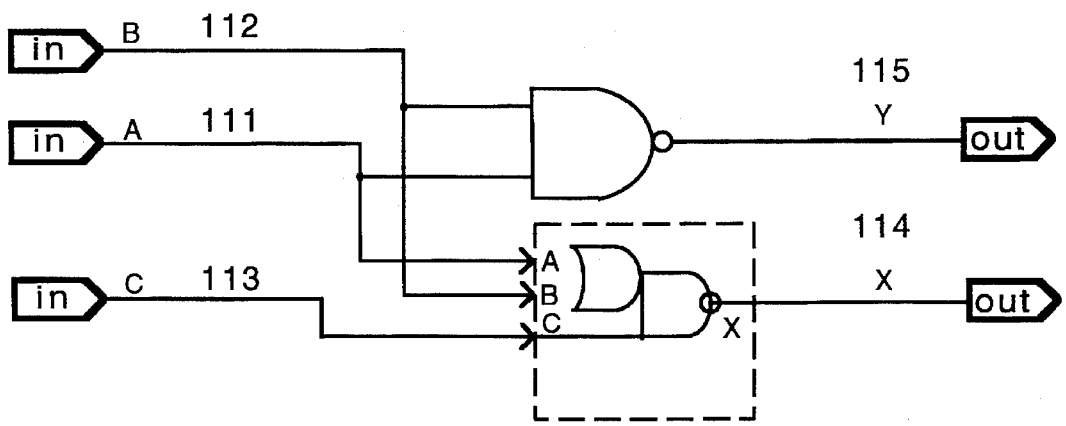
Figure 5:
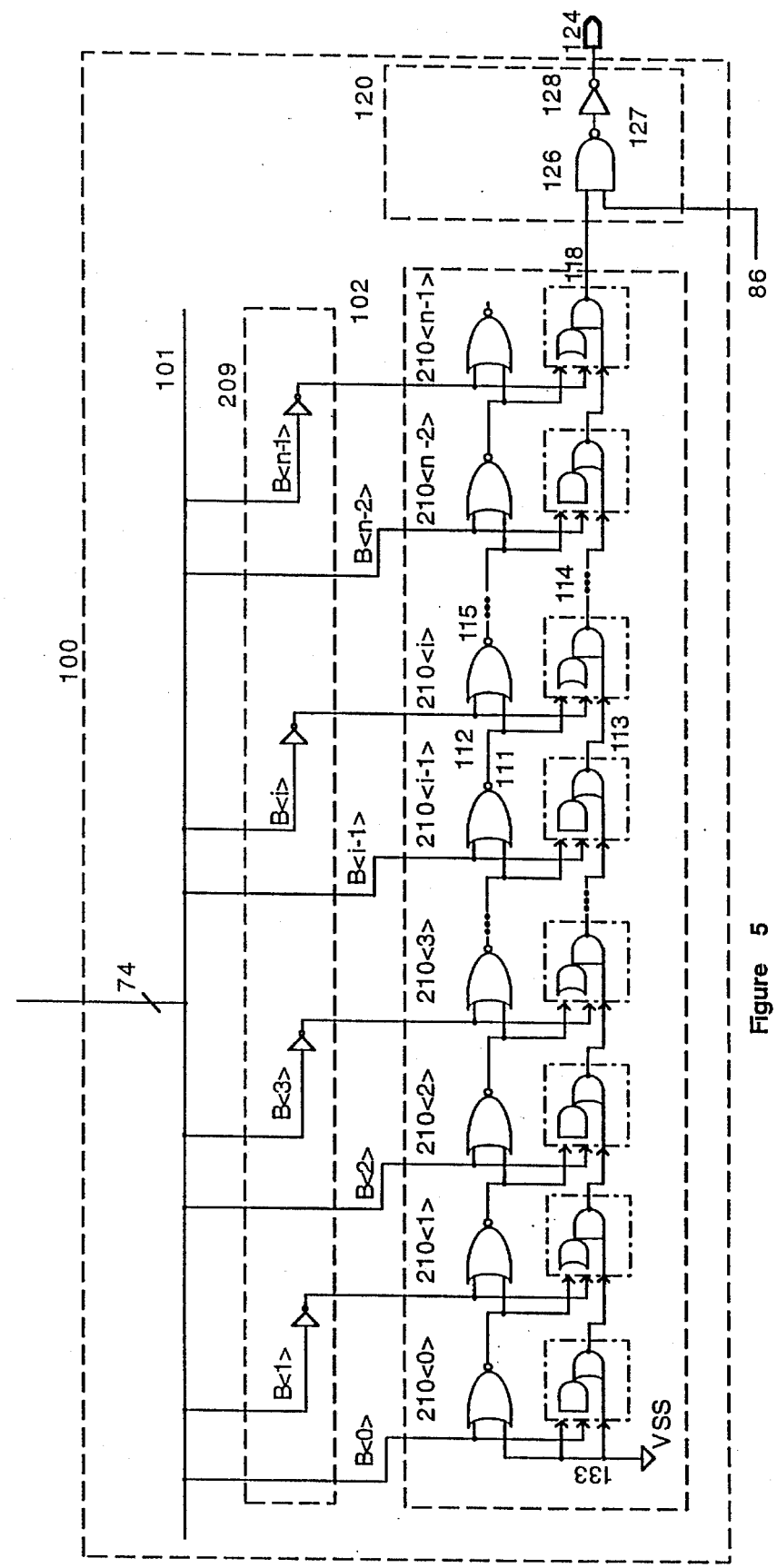
Figure 6:
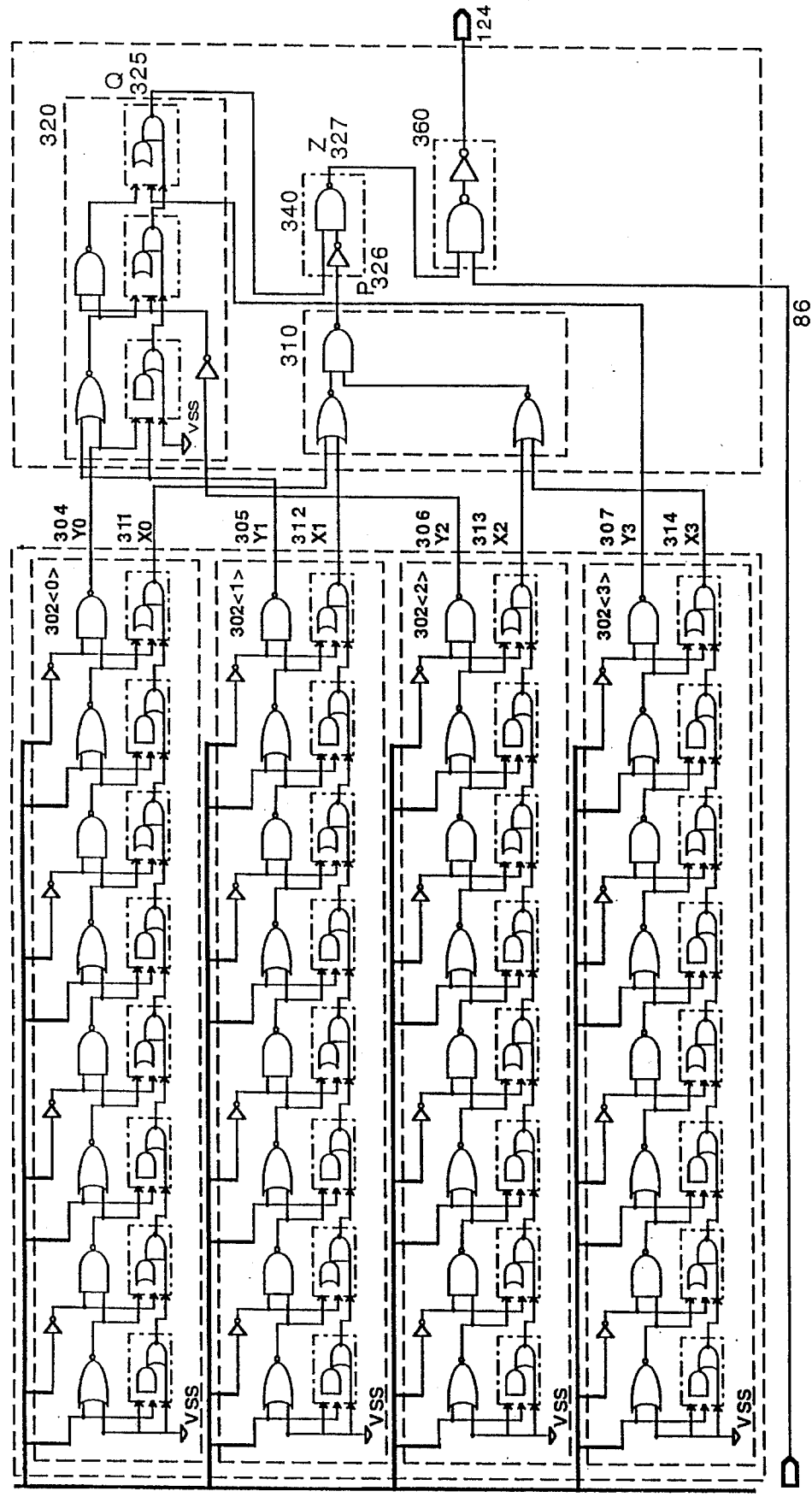

FIG. 2 illustrates a block diagram of a TLB including a precise error detection and shutdown circuit provided in accordance with the principles of this invention;

FIG. 3 shows a more detailed block diagram of a precise TLB error detection and shutdown circuit provided in accordance with the principles of this invention;

FIG. 4a illustrates an active-high input and an active-low output error detection unit;

FIG. 4b illustrates an active-low input and an active-high output error detection unit;

FIG. 5 illustrates a detailed schematic diagram of the precise TLB error detection and shutdown circuit of FIG. 3; and FIG. 6 illustrates the preferred embodiment of a precise TLB error detection and shutdown circuit provided in accordance with the principles of this invention.

DETAILED DESCRIPTION

FIG. 2 illustrates a block diagram of a TLB 90 having a precise error detection and shutdown circuit 100 provided in accordance with the principles of this invention. As shown in FIG. 2, error detection and shutdown circuit 100 is coupled to address comparator array 72 to receive as inputs, a n-bit tag compare indicator 74, TMAP[(n−1) . . . 0], and an address translation cycle indicator 86. Since each logical "1" in n-bit tag compare indicator 74 indicates a tag entry match, a physical address selection error arises when two or more logical "1"s" are detected in n-bit tag compare indicator 74, indicating two or more tag entry matches. TLB shutdown circuit 100 detects for a physical address selection error by determining whether two or more logical "1"s" are detected in n-bit tag compare indicator 74. An output TLB error and shutdown indicator 124 is generated whenever two or more logical "1"s" are detected in TMAP[(n−1) . . . 0] during an active address translation cycle. Although a matching tag entry is described in this embodiment as being indicated by a logical "1" and a non-matching tag entry as being represented by a logical "0", it is considered as within the scope of the practice of this invention to contemplate having matching tag entries be represented by logical "0"s", while non-matching tag entries are represented by logical "1"s".

FIG. 3 shows a detailed block diagram of a precise TLB error detection and shutdown circuit 100 provided in accordance with the principles of this invention. TLB error detection and shutdown circuit 100 receives input n-bit wide tag compare indicator 74, TMAP[(n−1) . . . 0], from a tag comparator array 72 of the TLB (see FIG. 2) and the address translation cycle indicator 86 from a TLB control logic unit (not shown). TLB error detection and shutdown circuit 100 comprises an array 102 of n unit <i> of error detection circuits 110, wherein i ranges from 0 to (n−1), with n equivalent to the n number of bits in tag compare signal 74, and a shutdown logic circuit 120. Each error detection unit 110 comprises receiving a first input bit 112, B<i>, a second input bit 111, A <i>, and a third input bit 113, C<i>. Each error detection unit 110 in array 102 is concatenated to another unit 110, such that, for example, except for i=0, each input bit A<i> of error detection unit <i> is coupled to receive an output bit Y<i−1> provided from an immediately preceding error detection unit <i−1>. Similarly, except for i=0, each input bit C<i> of error detection unit <i> is coupled to receive an output bit X<i−1> provided from an immediately preceding error detection unit <i−1>. For i=0, A<i> and

4

C<i> are coupled to an initialized state, such as, for example, a state equivalent to a logical "0".

Each error detection unit 110<i> generates a first output bit 114, X<i>, and a second output bit 115, Y<i>, wherein these two bits provide the result of the following Boolean operations:

$$Y{<}i{>} = A{<}i{>} + B{<}i{>} \qquad \text{(Eq. 1)}$$

$$X{<}i{>} = (A{<}i{>}B{<}i{>}) + C{<}i{>} \qquad \text{(Eq. 2)}$$

wherein bit A<i> indicates the result of detecting one or more logical "1"s" in a set of tag compare bits, B[(i−1) . . . 0], bit B<i> corresponds to an associated bit <i> of n-bit tag compare signal 74 (or TMAP <i>), and bit C<i> indicates the result of detecting two or more logical "1"s" in a set of tag compare bits, B[(i−1) . . . 0]. Thus, as illustrated by Boolean Eqn. 1, output bit Y<i> indicates the result of detecting one or more logical "1"s" in the set of bits B[i . . . 0], (corresponding to the set of input tag compare bits TMAP[i . . . 0]). While as illustrated in Boolean Eqn. 2, X<i> indicates the result of detecting two or more logical "1"s" in the set of tag compare bits, B[i . . . 0]. Consequently, terminal output bit 118, X<n−1>, generated by terminal error detection unit <n−1>, indicates the result of detecting two or more matching tag entries in the set of n-bit tag compare signal 74 bits, TMAP[(n−1) . . . 0].

TLB error detection and shutdown circuit 100 then provides output bit 118, X<n−1>, together with address translation cycle indicator 86 to shutdown logic circuit 120. Shutdown circuit 120 generates an active TLB shutdown indicator 124 in response to detecting an active state in both output bit X<n−1> and address translation cycle indicator 86 to thereby flag an error condition in the TLB. TLB shutdown signal 124 can be used to disable the output of PA Vector Array 82 (see FIG. 2) and the subsequent accesses of the TLB for address translation.

FIGS. 4a–4b show a more detailed schematic of two embodiments of error detection circuit unit 110 of FIG. 2. As illustrated in FIGS. 4a and 4b, the simple Boolean operations of output Y<i> and output X<i> shown in Eqns. 1 and 2 can be generated with different circuit implementations comprising one or more basic logic gates, such as NAND gate, AND gate, NOR gate, and OR gate. FIG. 4a shows an active-high input/active-low output error detection circuit unit 110A for generating a pair of X<i> and Y<i> active-low outputs, while FIG. 4b illustrates an active-low input/active-high output error detection unit 110B for generating a pair of X<i> and Y<i> active-high outputs.

FIG. 5 illustrates a detailed embodiment of array 102 comprising an array of error detection circuit units 210 that implements error detection units 110A and 110B of FIGS. 4a–4b. Since circuit 110A of FIG. 4a receives an active-high input signal and generates an active-low output signal, while circuit 110B of FIG. 4b accepts an active-low input and generates an active-high output signal, implementing error detection circuit array 102 by concatenating a unit 110A to a unit 110B in series avoids the need for additional logic inverters for inputs A<i> and C<i> between each detection circuit unit 210. Concatenating a unit 110A to a unit 110B thereby maximizes circuit performance and minimizes circuit real estate. However, because the signal polarity of the set of input tag compare bits 74 is either all active-high or all active-low, array of inverters 209 is provided to intercept the set of input bits TMAP<i> that are to be provided to input B<i> of error detection circuits 110B, since circuit 110B accepts an input signal polarity opposite that of input signal polarity of unit 110A. While, conceivably, input n-bit tag compare signal 74, input address translation cycle indicator 86, or output TLB shutdown indicator 124 can be required either active_high or active_low, it is envisioned that the arrangement of units 110A to units 110B can be modified to thereby accept and generate an active high or an active low signal as is needed. It is also envisioned that error detection array 102 may be comprised exclusively of one or more error detection units 110A concatenated in a series, or exclusively of one or more error detection unit 110B concatenated together to form array of error detection circuits 102. However, using exclusively circuit unit 110A or circuit unit 110B would require additional logic circuits to provide proper signal polarity to the inputs of each circuit unit.

FIG. 5 shows that array of error detection units 102 comprises (n/2) units of circuit 110A and (n/2) units of circuit 110B concatenated together in an alternating sequence to provide n units i of error detection circuit unit 210, for i ranging from 0 to n−1. Assuming n-bit tag compare signal 74 operates on an active_high transition, first error detection unit 210, unit <0> in array 102 thus comprises error detection unit 110A of FIG. 4a, wherein input bit B<0> receives input TMAP<0>. First error detection circuit 210, unit <0>, is coupled in series to a second detection unit 210, unit <1>, comprising error detection unit 110B of FIG. 4b. Since error detection unit <1> comprises unit 110B, which accepts an active-low input B<1>, TMAP<1> is coupled to array of inverters 209 to generate an inverted signal polarity of TMAP<1> to be supplied to input B<1> of unit 110B. The remaining circuits 210 in array 102, such as error detection unit <2>to unit <n−1>, likewise comprise units 110A or units 110B arranged such that, for i equivalent to an even numeral, error detection unit <i> in array 102 comprises error detection circuit 110A of FIG. 4a, and for i equivalent to an odd numeral, error detection unit <i> comprises error detection unit 110B of FIG. 4b. Similarly, for all odd numeral i, B<i> is coupled to inverter array 209 to receive an inverted TMAP<i> signal.

For i=0, input bit A<i> and C<i> are coupled to a reset signal 133, which is equivalent a logical value of "0", typically Vss. As described similarly in reference to FIG. 3, each error detection unit <i> in array 102 is concatenated to another detection unit in series, such that, for each circuit unit <i>, with i ranging from 1 to (n−1), input bit 111, A<i>, is coupled to output bit Y<i−1> of unit <i−1>, while input bit 113, C<i>, is coupled to output bit X<i−1> of unit <i−1>, and input bit 112, B<i>, is coupled to receive input bit TMAP<i> of n-bit tag compare indicator 74. Table 1 illustrates the Boolean function relation of input bits, A<i>, B<i>, and C<i>, to output bits, X<i> and Y<i>, of each unit i.

Terminal output bit 118, X<n−1>, thus indicates consequently a result of detecting whether two or more matching tag entries occurred. Output bit X<n−1> and address translation cycle indicator 86 are then coupled to shutdown logic circuit 120, such that shutdown circuit 120 generates an output high TLB shutdown signal 124 upon detecting an active state of both address translation cycle indicator 86 and output bit 118, X<n−1>. In the preferred embodiment, shutdown circuit 120 comprises a two-input NAND gate 126 coupled to an inverter gate 128. NAND gate 126 receives input address translation cycle bit 86, and it is also coupled to error detection unit array 102 to receive output bit 118, X<n−1>. NAND gate output 127 is coupled to an input of inverter gate 128, which generates TLB_Shutdown signal 124, as an output bit of TLB error detection and shutdown circuit 100.

Similar to Eqn. 1, output bit X<n−1> can also be expressed in terms of its inputs as follow:

$$X<n-1>=[A<n-1>B<n-1>]+C<n-1> \qquad \text{Eq. 3)}$$

Since for i>0, A<i>=Y<i−1> and C<i>=X<i−1>, X<n−1>can be further expressed as follow:

$$\begin{aligned}
X<n-1> &= [Y<n-2>B<n-1>] + X<n-2> \\
&= \{[A<n-2> + B<n-2>]B<n-1>\} + \\
&\quad [A<n-2>B<n-2>] + C<n-2> \\
&= \{[Y<n-3> + B<n-2>]B<n-1>\} + \\
&\quad [Y<n-3>B<n-2>] + X<n-3> \\
&= \{[A<n-3> + B<n-3> + B<n-2>]B<n-1>\} + \\
&\quad \{[A<n-3> + B<n-3>]B<n-2>\} + \\
&\quad [A<n-3>B<n-3>] + C<n-3> \\
&= \{[Y<n-4> + B<n-3> + B<n-2>]B<n-1>\} + \\
&\quad \{[Y<n-4> + B<n-3>]B<n-2>\} + \\
&\quad [Y<n-4>B<n-3>] + X<n-4> \\
&= \{[A<n-4> + B<n-4> + B<n-3> + \\
&\quad B<n-2>]B<n-1>\} + \\
&\quad \{[A<n-4> + B<n-4> + B<n-3>]B<n-2>\} + \\
&\quad \{[A<n-4> + B<n-4>]B<n-3>\} + \\
&\quad [A<n-4>B<n-4>] + C<n-4> \\
&= \ldots \\
&= [A<0> + B<0> + B<1> + \ldots + B<n-2>]B<n-1> + \\
&\quad [A<0> + B<0> + B<1> + \ldots + B<n-3>]B<n-2> + \\
&\quad [A<0> + B<0> + B<1> + \ldots + B<n-4>]B<n-3> + \\
&\quad [A<0> + B<0> + B<1> + \ldots + B<n-5>]B<n-4> + \\
&\quad \ldots + \\
&\quad [A<0> + B<0>]B<1> + C<0>
\end{aligned}$$

By setting A<0>=C<0>=0, X<n−1> can be expressed in terms of B's as

TABLE 1

| i | A<i> | B<i> | C<i> | X<i> | Y<i> |
|---|---|---|---|---|---|
| 0 | 0 | TMAP<0> | 0 | X<0> = A<0>B<0> + C<0> | Y<0> = A<0> + B<0> |
| 1 | Y<0> | TMAP<1> | X<0> | X<1> = A<1>B<1> + C<1> | Y<1> = A<1> + B<1> |
| 2 | Y<1> | TMAP<2> | X<1> | X<2> = A<2>B<2> + C<2> | Y<2> = A<2> + B<2> |
| . | | | | | |
| n−2 | Y<n−3> | TMAP<n−2> | X<n−3> | X<n−2> = A<n−2>B<n−2> + C<n−2> | Y<n−2> = A<n−2> + B<n−2> |
| n−1 | Y<n−2> | TMAP<n−1> | X<n−2> | X<n−1> = A<n−1>B<n−1> + C<n−1> | Y<n−1> = A<n−1> + B<n−1> |

$$X\langle n-1\rangle = [B\langle 0\rangle + B\langle 1\rangle + \ldots + B\langle n-2\rangle]B\langle n-1\rangle +$$
$$[B\langle 0\rangle + B\langle 1\rangle + \ldots + B\langle n-3\rangle]B\langle n-2\rangle +$$
$$[B\langle 0\rangle + B\langle 1\rangle + \ldots + B\langle n-4\rangle]B\langle n-3\rangle +$$
$$[B\langle 0\rangle + B\langle 1\rangle + \ldots + B\langle n-5\rangle]B\langle n-4\rangle +$$
$$\ldots +$$
$$[B\langle 0\rangle]B\langle 1\rangle$$

(Eq. 4)

Equation 4 therefore illustrates that result X<n−1> of array of detection circuits 102 achieves the same result as would be achieved by OR-ing a group of two term products comprising of different combinations of B<i> inputs to detect two or more logical "1's" in the complete set of B inputs. However, signal propagation delay is longer when all error detection units 210<i> are concatenated in only one array as is shown in array 102 of FIG. 5. Reduced signal propagation delays can be achieved by using shorter arrays. Thus in the preferred embodiment, array 102 is divided into shorter arrays of error detection units.

FIG. 6 illustrates the preferred embodiment of precise TLB error detection and shutdown circuit 100 that receives for example, a 32-bit tag compare signal 301, TMATCH [31 . . . 0]. Array of error detection circuits 102 comprises four unit m of sub-arrays 302 of error detection units 110A and 110B. Each sub-array 302, sub-array <m>, generates a pair of corresponding output bits Xm and Ym, wherein m ranges from [3 . . . 0]. If any of the output bits 311, 312, 313, or 314 (corresponding to X0, X1, X2 or X3) is equivalent to a logical 1, then two or more matching tag entries have been detected, while if any of the output bits 304, 305, 306, or 307 (corresponding to Y0, Y1, Y2 or Y3) is equivalent to a logical 1, then one or more matching tag entries have been detected. Bit pairs X0Y0, X1Y1, X2Y2 and X3Y3 are provided to a TLB shutdown circuit 120. TLB shutdown circuit 120 provides an X-term logic circuit 310 which compares all Xm bits prior to generating an output bit 326, P. Bit P is equivalent to a logical "1" if any one of the four bits, X0, X1, X2, or X3 is detected as a logical "1". Bits Y0, Y1, Y2 and Y3 are provided to a Y-term logic circuit 320 to generate an output bit 325, Q, wherein Q=0 (active-low), if at least two of the Y terms, Y0, Y1, Y2 or Y3 are equivalent to a logical "1", thereby indicating at least two matching tag entries. Bit 326 (bit P) and bit 325, (bit Q) are provided to TLB shutdown flag generator circuit 340.

TLB flag generator circuit 340 generates output bit 327, Z, wherein Z indicates a detection of at least two matching tag entries, such that, Z=1, if either P=1 or Q=0. Bit Z and address translation cycle indicator 86 are then provided to output logic circuit 360. Output circuit 360 generates an output TLB shutdown signal 124 if both bit Z and address translation cycle 86 correspond to a logical "1". TLB shutdown indicator 124 can then be used to alter processor status to indicate an incorrect state of the TLB and to thereby disable physical address vector array from supplying a wrong physical address to the memory address bus.

Although the invention has been described with respect to specific embodiments, it is envisioned that numerous variations may be made within the scope of the concepts taught in accordance with the invention.

We claim:

1. A precise TLB error detection and shutdown circuit for detecting a physical address selection error that results when two or more tag entries in a TLB match a virtual address received from an execution unit of a computer and for generating an output TLB shutdown indicator upon detecting the physical address selection error, the precise error detection and shutdown circuit comprising:

an input n-bit tag compare indicator from a tag comparator circuit of the TLB and an input address translation cycle indicator from a control logic unit of the TLB;

an array of n error detection unit <i>, wherein i comprises a positive integer ranging from 0 to (n−1) and n corresponds to the numeral n of the n-bit tag compare indicator, each error detection unit <i> includes:

a first input bit B<i>, the input B<i> corresponding to an associated bit <i> of the n-bit tag compare indicator;

a second input bit A<i>;

a third input bit C<i>;

a first output bit Y<i>, the output Y<i> indicating a result of detecting one or more matching tag entries in a set of input bits B[i . . . 0], and a second output bit X<i>, the output X<i> indicating a result of detecting two or more matching tag entries in the set of input bits B[i . . . 0], and wherein for i=0, bit A<i> and bit C<i> are coupled to receive an initialized bit, and wherein for i>0, each error detection unit <i> is coupled to another, such that bit A<i> is coupled to receive a first output bit Y<i−1> from detection unit <i−1>, while bit C<i> is coupled to receive a second output bit X<i−1> from detection unit <i−1>; and a TLB shutdown circuit, the TLB shutdown circuit coupled to receive the address translation cycle indicator and a terminal output bit X<n−1> from the terminal error detection unit <n−1> of the array of error detection unit <i>, the shutdown circuit generating the output TLB shutdown indicator in response to detecting an active state in the address translation cycle indicator and an active state in the output bit X<n−1>.

2. The precise TLB error detection and shutdown circuit of claim 1 wherein each output bit X<i> and Y<i> of error detection unit <i> provides a result of a Boolean operation, X<i>=(A<i>B<i>)+C<i> and Y<i>=A<i>+B<i>.

3. The precise TLB error detection and shutdown circuit of claim 1 wherein the array of n error detection unit <i> comprises four m sub-arrays of error detection unit <i>.

4. The precise TLB error detection and shutdown circuit of claim 1 wherein for i=0, the initialized bit coupled to bit A<i> and bit C<i> comprises a logical "0".

5. The precise TLB error detection and shutdown circuit of claim 1 wherein the array of error detection unit <i> comprises one or more NAND gates.

6. The precise TLB error detection and shutdown circuit of claim 1 wherein the array of error detection unit <i> comprises one or more NOR gates.

7. The precise TLB error detection and shutdown circuit of claim 1 wherein the array of error detection unit <i> comprises one or more error detection unit <i> accepting one or more active-high inputs and generating one or more active-low outputs.

8. The precise TLB error detection and shutdown circuit of claim 1 wherein the array of error detection unit <i> comprises one or more error detection unit <i> accepting one or more active-low inputs and generating one or more active-high outputs.

9. The precise TLB error detection and shutdown circuit of claim 1 wherein the array of error detection unit <i> comprises an arrangement of one or more error detection unit <i> accepting one or more active-high inputs and generating one or more active-low outputs coupled in combination with one or more error detection unit <i> accepting one or more active-low inputs and generating one or more active-high outputs.

10. The precise TLB error detection and shutdown circuit of claim 9 wherein the arrangement comprises each error detection unit <i> accepting one or more active-high inputs is coupled in series to each error detection unit <i> accepting one or more active-low inputs.

11. The precise TLB error detection and shutdown circuit of claim 9 wherein the arrangement comprises n/2 error detection units accepting one or more active-high inputs and n/2 error detection units accepting one or more active-low inputs.

12. The precise TLB error detection and shutdown circuit of claim 2 wherein the array of error detection unit <i> comprises one or more NAND gates to perform the Boolean operations generating output bit X<i> and Y<i>.

13. The precise TLB error detection and shutdown circuit of claim 2 wherein the array of error detection unit <i> comprises one or more NOR gates to perform the Boolean operations generating output bit X<i> and Y<i>.

* * * * *